United States Patent Office 3,274,103
Patented Sept. 20, 1966

3,274,103
FILTRATION
Loyd W. Adams, Dumas, Tex., assignor to Phillips Petroleum Company, a corporation of Delaware
No Drawing. Filed Apr. 15, 1963, Ser. No. 272,879
4 Claims. (Cl. 210—23)

This invention relates to an improved filtration process. In another aspect, this invention relates to the utilization of an improved filter aid in a filtration process.

Filtration processes are conventionally employed to remove entrained or suspended solid particles from liquids. Filters employed in such conventional filtration processes can, for example, comprise filter cloths or screens mounted upon rotating drums or cylinders. In addition to the suspended solids, it may be desirable to remove other entrained impurities such as suspended and/or emulsified liquid immiscible materials. For example, it may be desirable to remove hydrocarbons from water. Under these circumstances, a suitable filter aid must be found that can be placed on the filter cloth to remove the oil as the filter cloth separates the solids.

It has been discovered that a particulate or granular polymer of a 1-olefin and preferably a particulate or granular, precipitated polymer of a 1-olefin is an excellent contacting medium for removing oil or other immiscible liquid contaminants from fluids such as gases, water and aqueous salt solutions, said contaminants having a greater affinity for the 1-olefin polymer than said fluids. However, it has been observed that this polymer of a 1-olefin will not adhere to conventional filter leaves or other conventional filter media when it is attempted to employ the polymer of a 1-olefin as a filter precoat or filter aid.

Accordingly, an object of my invention is to provide an improved filtration process.

Another object of my invention is to provide a filtration process utilizing an improved filter aid.

Other objects, advantages, and features of my invention will be readily apparent to those skilled in the art from the following description and the appended claims.

In the preparation of my improved filter aid, I employ a polymer of a 1-olefin containing from 2 to 8 carbon atoms per molecule. The polymerization product can be a homopolymer or a copolymer or a mixture thereof. The polymerization product can be of high or low density.

The polymers employed in the practice of my invention are particulate or granular, porous polymers of 1-olefin containing from 2 to 8 carbon atoms per molecule and having no branching nearer the double bond than the 4-position. A presently preferred class of such polymers are those prepared by the process disclosed and claimed in Hogan et al. Patent 2,825,721, issued March 4, 1958.

In said patent there is disclosed and claimed a process for producing polymers of 1-olefin by carrying out the polymerization at a temperature in the range of 100–500° F. in the presence of 0.1 to 10 or more weight percent of chromium as chromium oxide, including a substantial proportion of hexavalent chromium associated with at least one porous oxide selected from the group consisting of silica, alumina, zirconia and thoria. A preferred catalyst is one comprising 0.1 to 10 weight percent chromium as the oxide on a silica-alumina support such as 90 weight percent silica–10 weight percent alumina. This catalyst is a highly oxidized catalyst which has been activated by high-temperature treatment under non-reducing conditions and preferably with an oxidizing gas. The polymerization is suitably carried out in the liquid phase, such as in solution in a hydrocarbon solvent, especially of paraffin and a naphthene which is liquid under the polymerization conditions; however, vapor phase operation or mixed phase operation can be effected.

Polymers prepared by the above polymerization reaction as well as those prepared by other catalyst systems such as disclosed by Karl Ziegler in Belgian Patent 533,362, can be precipitated by the water precipitation method disclosed and claimed in Wallace Patent 3,056,772, issued October 2, 1962. The Wallace patent discloses a process wherein a polymer of a 1-olefin dissolved in a hydrocarbon solvent is dispersed in water under conditions of temperature and pressure to maintain the solvent and water in the liquid phase, the resulting dispersion temperature regulated so that the polymers are substantially all precipitated and the resulting solvents are separated from the resulting two-phase liquid dispersion.

Examples of the preferred 1-olefins employed in my invention include ethylene, propylene, 1-butene, 1-pentene, 1-hexene, 1-octene, 4-methyl-1-pentene, 4-methyl-1-hexene, 5-ethyl-1-hexene, 6-methyl-1-heptene, 4-ethyl-1-hexene, and the like. It is also within the scope of the invention to employ copolymers of said 1-olefins. Thus, as employed herein and in the claims, unless otherwise specified, the term "polymer" includes homopolymers of said 1-olefins and copolymers of one of said 1-olefins with another of said 1-olefins as a comonomer. An example of a copolymer particularly suitable for use in the practice of the invention is a copolymer of 1-butene and ethylene having from 1 to 10, preferably 1.5 to 5, more preferably 1 to 3 weight percent of the 1-butene comonomer incorporated into the copolymer molecule.

Although not to be limited thereto, the 1-olefins can be polymerized in the presence of a solvent. The solvents especially useful in the polymerization of the 1-olefins are hydrocarbons and preferably paraffins including cycloparaffins. These diluents include paraffins and cycloparaffins having 3 to 12 carbon atoms per molecule. Any of the paraffins or cycloparaffins which are solvents for the polymer at the temperature in the polymerization range are suitable. Any hydrocarbon which is relatively inert, non-deleterious, and liquid under the operating conditions of the process can be utilized. Diluents or solvents that have been found particularly useful in the polymerization reaction include n-butane, isobutane, normal pentane, isopentane, isooctane (2,2,4-trimethylpentane), cyclohexane and methylcyclohexane.

In a preferred polymer water precipitation process, a hot polymer solution having a concentration in the range of 1 to 8 weight percent polymer is dispersed in 1 to 5 volumes of cool water to obtain the desired temperature and pressure conditions to maintain substantially all of the solvent and water in the liquid state until the polymer is precipitated and then the solvent is flashed off and the polymer is recovered.

It is preferred that the 1-olefin polymer have a relatively high surface area. It has been observed that 1-olefin polymers prepared by the water precipitation process have high surface areas and are, therefore, particularly adaptable to the preparation of an improved filter material.

The precipitated polymer of a 1-olefin is combined with a conventional filter aid to provide an improved filter material or filter aid that will adhere to filter leaves or other conventional filter media as a filter precoat or filter aid. Conventional filter aids that may be employed consist of solid particles which produce relatively non-compressible and porous filter cakes, are chemically inert to the 1-olefin polymers and in combination with the 1-olefin polymers provide a mixture that will adhere to conventional filter media. Suitable conventional filter aids comprise materials such as kieselguhr, diatomaceous earth, asbestos fibers, pulverized bone black, ground sea shells, sea sand, Fiberglas, perlite, sawdust, cotton and wool fibers, etc.

The 1-olefin polymer is combined with the conventional filter aid so as to provide an improved filter aid material wherein the concentration of the said 1-olefin polymer is normally in the range of 2–45 weight percent, although concentrations outside this range can be employed. Preferably, although not to be limited thereto, the amount of 1-olefin polymer combined with the conventional filter aid is within the range of from 1 to 10 parts by weight of polymer per 1 part by weight of immiscible liquid contaminant to be filtered from a fluid feed.

Conventional methods of combining the 1-olefin polymer and filter aid can be employed. For example, the filter aid and 1-olefin polymer can be mixed in a liquid inert to the filter aid and the 1-olefin polymer, thereby preparing a slurry of the improved filter material. The concentration of solids in the slurry normally will range from 2 to 30 weight percent, although concentrations of solids outside this range can be employed. Suitable liquids that can be employed include water and the low molecular weight normal paraffins, such as n-pentane. The prepared slurry can then be passed into a filter for precoating the filter. The mixture of solids will form a precoat that is advantageous in filtration processes.

It is also within the scope of this invention to dry mix the conventional filter aid and the 1-olefin polymer, thereafter preparing a slurry of the dry mixture in a liquid inert to the filter aid and the 1-olefin polymer, and then to apply the slurry as a precoat to filter media such as a filter cloth.

The inventive improved filter aid can be employed to filter immiscible liquid contaminants from fluid streams wherein said contaminants have an affinity for the 1-olefin polymer greater than the affinity of the said contaminants for the said fluid stream. The improved filter aid is particularly effective in filtering liquid hydrocarbons from fluids immiscible with said liquid hydrocarbons.

The following example will further illustrate the invention, but it is not intended that the invention should be limited thereto.

*Example*

Particulate polyethylene prepared by the water precipitation polymerization of ethylene is dry mixed with diatomaceous earth so as to prepare a mixture containing 4 weight percent polyethylene. Water is added to the mixture so as to prepare a slurry containing 5 weight percent solids.

The slurry is added to a filter cloth positioned on a rotating drum. A feed mixture comprising oil, water and inert solids is brought into contact with the filter cloth containing the prepared improved filter aid. Concentration of oil in the feed mixture is 500 parts per million. The solids are filtered from the feed mixture by the filter cloth and the concentration of oil in the filtrate is less than 10 parts per million.

As will be evident to those skilled in the art, various modifications of this invention can be made or followed in the light of the foregoing disclosure and discussion without departing from the spirit or scope thereof.

I claim:

1. A filtration process which comprises coating a filter with a mixture of (1) a solid polymer of 1-olefins containing from 2 to 8 carbon atoms per molecule and (2) a filter aid material, and passing through the resulting coated filter a fluid mixture containing at least one liquid constituent which is immiscible with at least one of the other constituents, whereby said one liquid constituent is separated from said at least one other constituent.

2. The process of claim 1 wherein said one liquid constituent is an oil and said at least one other constituent is an aqueous liquid.

3. The process of claim 1 wherein said filter aid is selected from the group consisting of kieselguhr, diatomaceous earth, asbestos fibers, pulverized bone black, ground sea shells, sea sand, Fiberglas, perlite, sawdust and cotton and wool fibers.

4. The process of claim 1 wherein said filter aid is diatomaceous earth and said polymer is polyethylene.

References Cited by the Examiner
UNITED STATES PATENTS
2,993,599    7/1961    Moon et al. _____ 210—75

REUBEN FRIEDMAN, *Primary Examiner.*

SAMIH ZAHARNA, *Examiner.*